US007319040B2

(12) United States Patent
Vaidyanathan et al.

(10) Patent No.: US 7,319,040 B2
(45) Date of Patent: Jan. 15, 2008

(54) PROCESS CONTROL USING ON-LINE INSTRUMENTATION AND PROCESS MODELS

(75) Inventors: Ramaswamy Vaidyanathan, Aurora, IL (US); Ronald S. Hurlbut, Naperville, IL (US); William D. Stephens, Batavia, IL (US); David R. Van Hare, Parkville, MO (US)

(73) Assignee: Ineos USA LLC, Lisle, IL (US)

( * ) Notice: Subject to any disclaimer, the term of this patent is extended or adjusted under 35 U.S.C. 154(b) by 354 days.

(21) Appl. No.: 10/281,624

(22) Filed: Oct. 28, 2002

(65) Prior Publication Data

US 2004/0083028 A1 Apr. 29, 2004

(51) Int. Cl.
*G01N 24/00* (2006.01)
*G01N 33/44* (2006.01)
*G01N 21/00* (2006.01)

(52) U.S. Cl. ............... 436/173; 436/85; 436/164
(58) Field of Classification Search ............... None
See application file for complete search history.

(56) References Cited

U.S. PATENT DOCUMENTS

| 4,349,869 | A | 9/1982 | Prett et al. | 364/159 |
|---|---|---|---|---|
| 4,616,308 | A | 10/1986 | Morshedi et al. | 364/159 |
| 4,888,704 | A | 12/1989 | Topliss et al. | 364/500 |
| 5,504,166 | A | 4/1996 | Buchelli et al. | 526/60 |
| 5,650,722 | A | 7/1997 | Smith et al. | 324/307 |
| 5,675,253 | A | 10/1997 | Smith et al. | 324/306 |
| 5,877,954 | A | 3/1999 | Klimasauskas et al. | 364/149 |
| 5,933,345 | A | 8/1999 | Martin et al. | 364/164 |
| 6,072,576 | A | 6/2000 | McDonald et al. | 356/300 |
| 6,144,897 | A | 11/2000 | Selliers | 700/269 |
| 6,204,664 | B1 | 3/2001 | Sardashti et al. | 324/306 |
| 2002/0103548 | A1 | 8/2002 | Treiber et al. | 700/30 |

FOREIGN PATENT DOCUMENTS

| WO | 0151588 | 7/2001 |
|---|---|---|
| WO | 0146762 | 8/2001 |

OTHER PUBLICATIONS

Thompson et al. "Modeling chemical processes using prior knowledge and neural networks" AIChE Journal. New York: Aug. 1994. vol. 40; p. 1328.*
Thor Mejdell and Sigurd Skogestad, "Estimation of Distillation Compositions from Multiple Temperature Measurements using PLS Regression," Paper 148d., AIChE Annual Meeting (1991).
Robert R. Megien, "Examining Large Databases: A Chemometric Approach Using Principal Component Analysis," Journal of Chemometrics, vol. 5, (1991): 163-179.
Robert R. Megien; "Chemometrics: Its Role in Chemistry and Measurement Sciences," Chemometrics and Intelligent Laboratory Systems, vol. 3 (1988): 17-29.

* cited by examiner

*Primary Examiner*—Yelena G. Gakh
(74) *Attorney, Agent, or Firm*—David P. Yusko

(57) ABSTRACT

A method for providing improved estimates of properties of a chemical manufacturing process is disclosed. The method employs a process model that includes, or is modified by, scores or other gains obtained from the mathematical transformation of data obtained from an on-line analyzer. Chemical manufacturing processes using the method also are disclosed.

12 Claims, 7 Drawing Sheets

PROCESS CONTROL USING ON-LINE INSTRUMENTATION AND PROCESS MODELS

FIELD OF THE INVENTION

The invention relates to chemical manufacturing process control. More specifically, the invention relates to the use of information obtained by mathematical manipulation of on-line analyzer data. This information describes sources of variability in manufactured materials, which can be used to improve the performance of controllers or process models used in a chemical manufacturing process.

BACKGROUND OF THE INVENTION

Chemical manufacturing processes typically operate in the liquid or gas phase within a set of operating conditions such as temperature, pressure, and catalyst concentration to produce a material having a desired set of physical and chemical properties.

For example, one or more olefins can be reacted in a liquid or gas phase reactor in the presence of a catalyst to produce a polyolefin or other polymer. A variety of polymers having different properties can be manufactured in the same reactor by altering the operating conditions, types and ratios of reactor feedstock, catalyst and additives. One polymer property often of great interest is polymer melt flow rate.

Modern chemical reactors typically employ computer-based control of some type to maintain product quality and to transition operation from the manufacture of one product to another. Where the reactor is used to manufacture polypropylene, the melt flow rate can be altered if the control program alters, for example, the hydrogen to propylene ratio present in the reactor.

The types of control used in modern reactors can range from one or more control loops using relatively simple proportional integral derivative (PID) or fuzzy logic controllers to sophisticated state of the art predictive control programs. Control systems of modern polypropylene plants used to control the properties and consistency of the manufactured polypropylenes typically are predictive models, and can be of the "first principles" type, semi-empirical type, or completely empirical type.

A first principles model employs process control equations derived from physical and chemical relationships that describe various aspects of the interaction of materials within the process. A semi-empirical model employs equations of the type used in a first principles model but which have been modified by empirical analysis of data to produce a somewhat better result. An empirical model uses relationships derived from observation of the process behavior in an attempt to model the behavior, without any particular regard for the first principles type of equations typically used to describe behavior of materials within the reactor and associated processes. Examples of empirical models include many forms of regression models, including neural networks. In practice, these three model types represent a continuum of models useful for predictive control of the reactor, and most models will exhibit at least some degree of both first principle and empirical concepts.

A goal of most any polymer control system or process model will be to produce a material having a specified set of properties, including polymer melt flow rate. Because loop control and models both tend to represent imperfect descriptions of behavior, the properties of materials produced using control based on these principles tend to differ somewhat from the desired values of the actual properties as measured in the lab.

Where predictive models are used, the time required to identify the difference between predicted and measured polymer properties has led to various efforts to develop on-line instrumentation capable of measuring directly or inferring a product quality during polymer production. For example, it is known to use various on-line viscometers to directly measure rheometric properties of polymers. Alternatively, on-line instruments such as Fourier transform infrared spectrometers ("FTIRs"), near infrared spectrometers ("NIRs"), ultraviolet-visible ("UV-VIS") spectrometers, Raman spectrometers and nuclear magnetic resonance spectrometers ("NMRs" or "IMRs") have been used with varying degrees of success to infer material properties, such as melt flow rates (MFR), from the types of data that can be generated by these instruments and their associated data analysis software. Inferences of a property such as melt flow rate from spectrometric data typically is accomplished using advanced mathematical techniques such as multivariate curve fitting, neural networks, Principal Component Regression (PCR), or Partial Least Squares Regression Analysis (PLS), to transform the raw spectrometric data into an estimate of the desired physical property. Additional background information concerning PCR and PLS can be found in "Partial Least Squares Regression: A Tutorial", Analytica Chimica Acta 185 (1986) 1-17, by P. Geladi and B. R. Kowalski.

In PCR and PLS, the spectrometric data are decomposed into two matrices, a "scores" matrix and a "loadings" matrix. The loadings matrix is a vector matrix containing the minimum number of vectors that adequately describe the variability in the spectral data while providing the desired level of predictive ability in the resulting model. The scores matrix is a scalar matrix that is calculated from each of the loadings vectors and each sample spectrum.

Thus, each sample spectrum in the calibration set can be reconstructed from a linear combination of the products of scores and loadings. For example, a four factor PCR or PLS model will have four loadings vectors and each sample can be described by four scalar values (the scores). A subset of one or more of these scores typically describes most of the variability attributable to a property such as melt flow rate. Additional information concerning the development and use of these techniques can be found in "Chemometrics: Its Role in Chemistry and Measurement Sciences", *Chemometrics and Intelligent Laboratory Systems,* 3 (1988) 17-29, Elsevier Science Publishers B. V., and "Examining Large Databases: A Chemometric Approach Using Principal Component Analysis", *Journal of Chemometrics,* Vol. 5, 163-179 (1991), John Wiley and Sons, both authored by Robert R. Meglen, the disclosure of each being incorporated by reference in its entirety.

"Coefficients" from multivariate curve fits and "weights" or "hidden node outputs" from neural network analysis are analogous concepts to the techniques discussed above and can also be used in combination with a process model.

In some cases, process control engineers have attempted to enhance spectral analyzer results by performing regression analysis of local process variables measured in-situ or in the immediate vicinity of the analyzer with scores resulting from the estimation of a property, such as Mooney viscosity, by on-line instrumentation. One such approach is described in U.S. Pat. No. 6,072,576 to McDonald, et al, the disclosure of which is hereby incorporated by reference. While this method may lead to improved process control in some cases, the industry desires new, more powerful approaches to integrating on-line instrumentation and process control. Such improved techniques would be useful, for example, to minimize variability in manufactured materials, or to minimize transition times when switching from the manufacture of one material to another. Ideally, these techniques could be used to improve the performance of plants using simpler control schemes such as PID or fuzzy logic control loops, as well as the performance of those plants using sophisticated predictive control models.

SUMMARY OF THE INVENTION

We have found that substantial improvement in process control may be provided in estimating product properties or process conditions of state by combining certain "scores" resulting from a mathematical technique used to derive distinct sources of variability in on-line sample data with a process model to yield an enhanced estimate of a process property such as melt flow rate.

This enhanced estimate then can be used directly for process control, such as being used as an input to a PID or fuzzy logic control loop, or in connection with a first principles, semi-empirical or empirical predictive process model that requires use of the estimated process property as a variable to provide for improved, preferably predictive, process control.

It should be noted that the use of one or more physical measurements obtained at or near an on-line analyzer for the purpose of improving the property measurement ability of the analyzer, whether or not such data is mathematically transformed by linear regression or other method, is not considered to be use of a process model in connection with an analyzer as contemplated by our invention. Similarly, the regression of directly measured process variables only with scores, such as in Example 4, while constituting a model, is not a "process model" as that term is used in this application.

In one embodiment of our invention, we obtain an improved estimate of a product property, or process condition or state (hereafter generically a "property), useful in a chemical manufacturing process. The improved estimate is obtained by using a process model for predicting the property in connection with one or more scores correlative to the property. The scores are obtained by mathematically transforming data obtained from an on-line analyzer. The improved estimate of the property may then be used by a controller to provide for improved plant performance.

As used in this application, a "controller" can be any device, including, but not limited to, hardware or software, capable of accepting an estimate of a desired property and using that estimate to alter its control output. For example, a controller can be a simple loop controller based on PID or fuzzy logic, or a multivariate predictive optimizer controller, as discussed in more detail below.

"Chemical reactor" means any vessel in which a chemical feedstock is converted into a different chemical effluent, whether or not in the presence of a catalyst or other materials, and without regard for whether the reaction occurs in a liquid, solid or gaseous phase, or as a supercritical fluid, or combinations thereof.

When scores or other "gains" as described below are used in "connection with" or "in association" with a process model, it means that the scores or other gains can be terms embedded within a linear or non-linear model of the process, or that the scores or other gains can be used in a linear or non-linear equation in which the process model's output is also used as a term in the equation.

When developing a calibration model, a "mathematical transformation" means to operate on a set of calibration data (such as a set of free induction decay curves from a nuclear magnetic resonance analyzer) to reduce the data to scores and loadings vectors that represent a simplified data set that when taken together can be used to reproduce the raw data to a high degree of certainty, but which reduce the number of dimensions required to describe the data set to a lower number of dimensions better suited for use in control or prediction applications. When predicting from a developed model, "mathematical transformation" means mathematical manipulation of sample data from an on-line instrument by any method that yields a matrix of scores representative of the sample data and calculated from the calibration loadings vectors and the on-line analyzer spectra data, each loadings vector capturing a distinct source of variability in the measured samples of a calibration data set.

"On-line analyzer" refers to any instrument capable of producing data that can be transformed into scores that can be correlated to a property in real time, or in sufficiently near real time so as to be useful for process control purposes. An on-line analyzer useful for this purpose typically will be any analyzer that can provide an estimate of a property to the control system faster, more frequently or more conveniently than the system can be provided the measured value of that property from samples drawn and analyzed in the laboratory. Typically, such on-line analyzers are spectral analyzers such as NMR, IR, NIR, UV-VIS or Raman spectrometers, as the spectra generated by these devices lend themselves well to the application of the mathematical techniques described above, but the term "on-line analyzer", as used in this invention, includes any analyzer capable of generating a data set that can be subjected to the mathematical transformation processes mentioned above.

In some embodiments of this invention, the free induction decay curves ("FIDs") obtained from on-line nuclear magnetic resonance measurements of a chemical product, such as a propylene-containing polymer, are mathematically transformed by Partial Least Squares analysis to obtain scores which are incorporated into a semi-empirical model of melt flow rate.

In other preferred embodiments of our invention, a predictive process model is used to generate a first estimate of a property of a manufactured chemical product. Data from on-line measurement of the chemical product then is mathematically transformed to provide scores used to refine the first estimate of the property.

In yet another embodiment of our invention, a chemical manufacturing process uses an on-line analyzer to collect data for a chemical material at a point within the manufacturing process; mathematically transforms the data using the loadings matrix to produce scores related to properities of the chemical material; uses the scores in connection with a process model to produce an improved estimate of a property of interest for the chemical material; and inputs the improved estimated property into a controller used in the chemical manufacturing process. The controller output can then be varied in response to the estimated property to cause the property of interest to move toward a desired value.

As used in this application, "process model" means any process model that generates predicted values of one or more process variables at the then current time to determine whether control actions should be taken by one or more controllers at about the same point in time. Such controllers may be linear or nonlinear. The term "nonlinear", when used in describing a controller, means a controller that is capable of optimizing non-linear relationships, either directly, but more typically indirectly, such as by approximating solutions to non-linear relationships, using multiple equations to model a non-linear relationship over discrete ranges of variable values.

In preferred embodiments, a predictive process model is used in association with one or more multivariate predictive optimizer controllers.

As used in this application, "predictive process model" means any forward-looking process model that generates predicted values of one or more process variables at a future point in time to determine whether control actions should be taken by one or more controllers at a present or a future point in time. As with process models generally, such controllers may be linear or nonlinear. In some preferred embodiments of the invention, a predictive process model is associated with one or more multivariate predictive optimizer controllers.

A "multivariate predictive optimizer controller" is a controller that is based on multi-variable dynamic (i.e., time-variant) expressions, which is the compiling or calculation of a matrix of values or functions which relate a plurality of manipulated and, optionally, disturbance variables, to a plurality of control variables, and optionally, to constraint variables, in such a manner as to facilitate prediction of state variables at future points in time and to enable control of a system based in whole or in part on such predictions.

In some preferred embodiments of these inventions, the chemical reactor is a polyolefin reactor. As used herein, a "polyolefin reactor" is a chemical reactor in which at least fifty weight percent of the reactor feedstock is propylene and/or ethylene, which is reacted in the presence of a catalyst to produce a polyolefin comprising polypropylene, polyethylene or co-polymers thereof. Reactor types typically used for the production of polyolefins include gas phase fluidized bed reactors, gas phase subfluidized bed reactors, stirred tank reactors, liquid pool reactors, gas loop reactors having one or more fluidization domains, such as multi-zone circulating reactors having a fluidization zone and a packed bed zone where polymer powder flows by the force of gravity, and supercritical loop reactors.

Preferably, polyolefin reactors use catalysts selected from the group consisting of Ziegler-Natta, late transition metal, and metallocene catalysts, and more preferably, the manufacturing process occurs at least partially in the gas phase. This embodiment is particularly useful for the manufacture of polyolefins and olefin copolymers, and in particular, ethylene and propylene-containing polymers or copolymers. The invention particularly can be used effectively in connection with one or more horizontally agitated, sub-fluidized bed gas phase reactors.

BRIEF DESCRIPTION OF THE DRAWINGS

FIG. 2 is a schematic diagram of a system for making polypropylene. The system uses two reactors of the type described in connection with FIG. 1. The system employs a predictive process model for process control, and an on-line analyzer capable of providing sample data, which can be mathematically transformed to yield scores that can be used in combination with the process model to estimate melt flow rate.

DETAILED DESCRIPTION OF THE INVENTION

Applicants' invention is described below in detail in connection with the manufacture of polypropylene. Applicants' invention is useful in many chemical manufacturing environment, and can be adapted to other processes by those skilled in the art using the teachings contained in this application.

Figure 1:
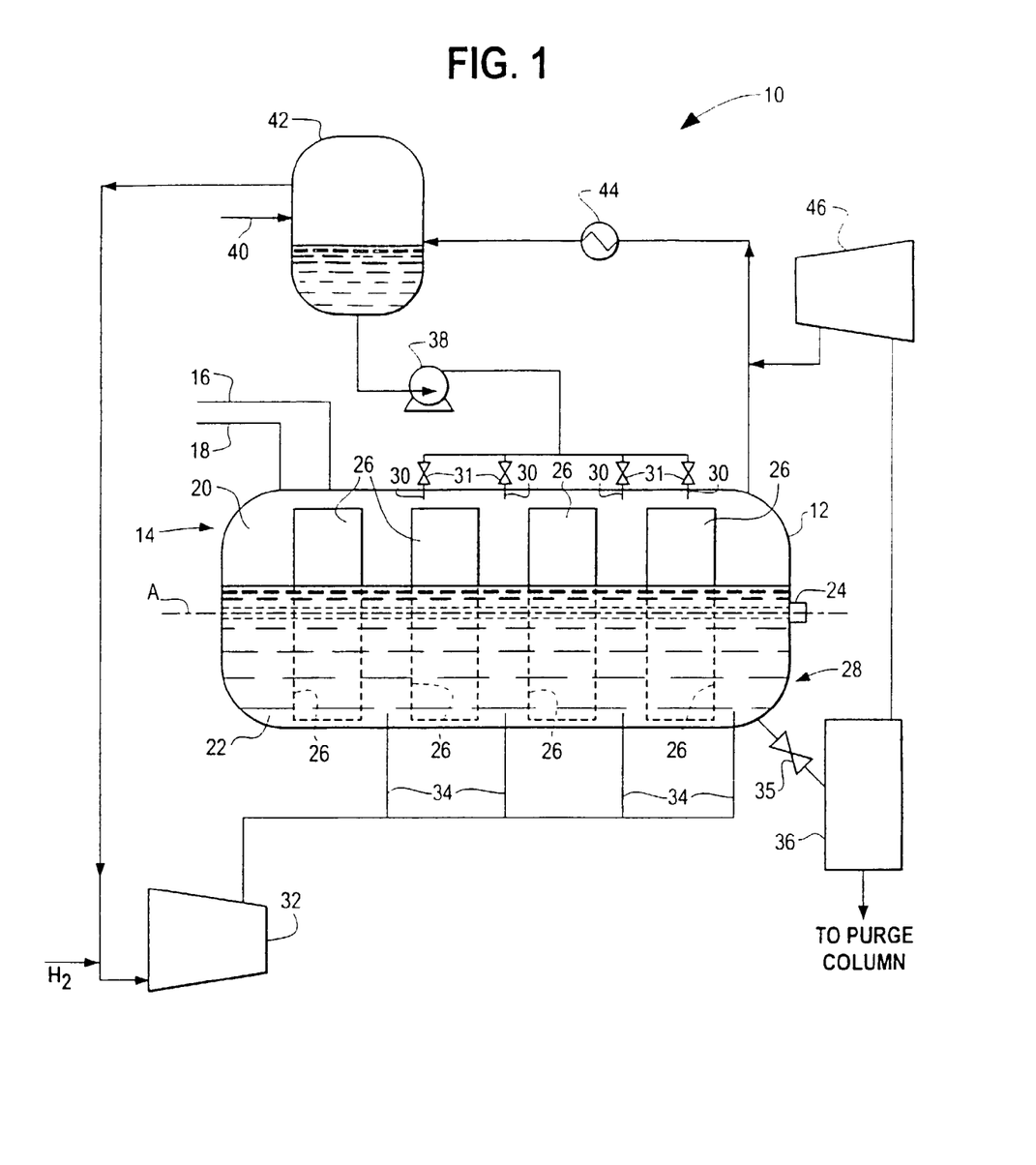
FIG. 1 is a diagram showing a horizontally agitated subfluidized bed reactor and associated equipment for the manufacture of polypropylene.

FIG. 1 illustrates a horizontal, mechanically agitated, sub-fluidized bed reactor system 10 including certain key associated equipment used for the manufacture of polypropylene.

Polymerization of monomer feedstock occurs in a horizontal, cylindrical reactor vessel 12. Catalyst, co-catalyst and modifiers can be fed at a continuously variable rate separately into an inlet end 14 of vessel 12 through feedlines 16 and 18.

During steady state operation, polymerization begins in a vapor space 20 located in the upper portion of vessel 12, and, as particle size increases and particles settle, continues in a particulate bed 22 occupying the lower portion of vessel 12. An agitator 24 is located along the longitudinal axis A of vessel 12. Paddles 26 of agitator 24 stir particulate bed 22 as agitator 24 is turned, thereby promoting mixing and a plug flow movement of material in particulate bed 22 towards a discharge end 28 of vessel 12.

Monomer and condensed liquid from vapor/liquid separator 42 (collectively referred to as "quench liquid") are added into vapor space 20 of vessel 12 through quench nozzles 30 longitudinally located in vapor space 20 near the top of vessel 12. The liquid added through nozzles 30 cools hot particles located on the upper surface of particulate bed 22, and paddles 26 subsequently drive these cooled particles, and any remaining liquid monomer, into particulate bed 22 to continue the exothermic polymerization reaction and to further cool bed 22. The flow of liquid into vessel 12 can be controlled regionally within vessel 12 by quench control valves 31.

Recycled reactor vapor can be introduced through compressor 32 into a lower portion of bed 22 through gas inlets 34. Hydrogen also can be introduced into the lower portion of bed 22 through gas inlets 34 by adding hydrogen at or near the inlet or outlet of compressor 32.

Polymer product is removed from discharge end 28 of vessel 12 through one or more discharge valve(s) 35. The discharged product passes through a solid/gas separator 36 (also referred to as the "baghouse"), after which the discharged solid product is transferred to a purge column (see FIG. 2), while the separated gas is routed to offgas compressor 46 to be compressed prior to condensation for make-up to vessel 12.

Reactor offgas cooler condenser 44 condenses vapor drawn directly from reactor vapor space 20, as well as condensed offgas removed from solid/gas separator 36, which was compressed by offgas compressor 46. Vapor and liquid feed to vessel 12 is accomplished using liquid/vapor separator 42. Liquid for feed to vessel 12 through pump 38 is a combination of condensate and fresh monomer make-up through monomer make-up line 40.

Under nominal operating conditions, the reactor system described above operates at pressures of from about 1400 to 2800 kPa (200 to 400 psig) and at temperatures of from about 50 to 90 degrees Centigrade (122 to 194 degrees Fahrenheit). The volume of the particulate polymer bed typically occupies between about 40 to 80 percent of the volume of vessel 12.

Figure 2:
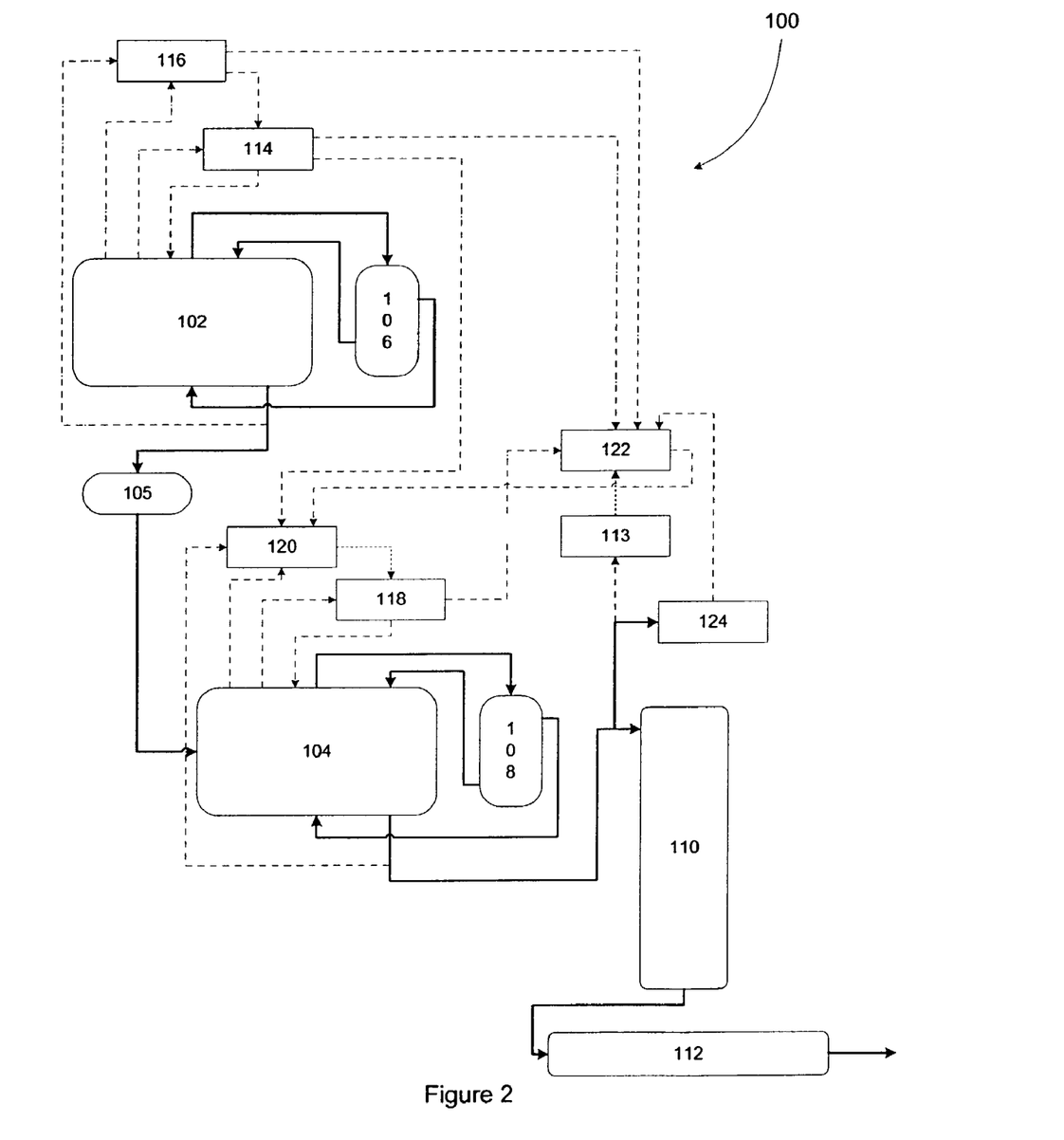

Reactor system 10 typically can be used to produce homopolypropylene or random copolymers of propylene and other olefins, such as ethylene. Control of such a reactor system typically involves the use of an empirical, semi-empirical or first principles reactor process model, as discussed in greater detail below. The process model advantageously employs an estimate of polymer melt flow rate obtained in part from scores resulting from the mathematical transformation of FID curve data obtained from an on-line NMR analyzer located as shown in FIG. 2.

Control of a reactor system 10 typically requires manipulation of process variables such as:

a) catalyst flow to control production rate;

b) hydrogen concentration to control molecular weight or melt flow rate;

c) comonomer feed and concentration (when making random copolymers) to control product properties;

d) cocatalyst to catalyst ratio;

e) cocatalyst to electron donor ratio when using catalyst systems having cocatalysts such as tri-alkyl aluminum and external electron donors; and f) various gas concentrations and ratios in the recycle loops to determine the proper make-up of raw and recycled materials to maintain the desired in-reactor concentrations.

FIG. 2 is a simplified schematic diagram of a chemical manufacturing process 100 capable of making homopolymers, random copolymers and impact copolymers of polypropylene. In FIG. 2, the solid lines indicate the flow of materials, while the dashed lines indicate the flow of information. As will be recognized by those skilled in the art, random copolymers typically are those materials formed by the introduction of two or more polyolefins in a single reactor, and impact copolymers typically are those materials formed by first producing a polymer such as a polypropylene material in a first reactor or reaction zone, which is transferred into a second reactor or reaction zone to incorporate an impact-modifying material formed in the second reaction zone, such as an ethylene-propylene ("EPR") rubber. System 100 physical plant equipment includes a first reactor 102, a second reactor 104, a first reactor liquid gas separator 106, a second reactor liquid gas separator 108, a purge column 110 for degassing residual hydrocarbons from the impact copolymer powder produced in reactor 104, an extruder 112 for converting the degassed powder into pellets, as are typically used by the conversion industry, and an on-line NMR melt flow analyzer 113 located between the baghouse (see element 36 of FIG. 1) and purge column 110 as well as a laboratory 124 which performs product analysis of samples collected at the point of the NMR analyzer 113. System 100 can also include non-linear multivariable predictive optimizer controllers, in this case the four optimizers 114, 116, 118 and 120, as well as a computer 122 capable of performing the calculations described herein when used in the configuration described in Example 3. These controllers and computer are included in FIG. 2 for discussion of Example 3, and are not necessarily part of system 100. Discussion of these elements is provided in detail in connection with Example 3, below. Reactors 102 and 104 typically operate in the manner described in detail in connection with the description of system 10 of FIG. 1 and with auxiliary equipment of the type described in connection with FIG. 1. The operation of horizontal gas phase reactors of this type is well known to those skilled in the art, and is described in our U.S. Pat. Nos. 4,888,704 and 5,504,166, the disclosure of each being hereby incorporated by reference.

Reactors 102 and 104 operate using a process control program that requires an estimate of product melt flow rate as measured between baghouse 36 (see FIG. 1) and purge column 110 (see FIG. 2). Use of our invention to obtain good estimates of the melt flow rate is demonstrated by Example 1, below.

The same calibration and validation data sets have been used for Examples 1, 2, and 4 below. For the calibration set, data were collected during a three month period. There were 425 data points in the calibration set. All calibration data have been adjusted by a time lag approximately equal to the time required for material produced in the reactor to pass through system 100 to the point where the on-line analyzer is located so that on-line data will be representative of material produced in the reactors at an earlier point in time. Additionally, process data has been averaged over about a one half to one hour period around the time selected as representative of the manufactured material. Similar time lags and time averaged measurement of process conditions preferably would be used when implementing the embodiment of the invention described in Example 3, and preferably are employed wherever on-line instrument data is acquired at a point located substantially downstream (with respect to time) from the point where process conditions are measured.

For the validation set, data were collected for a one-year period. Validation data have been filtered against the following criteria to ensure stable process conditions. All process and scores data are based on 8-hour averages. For process data, each 8-hour interval was broken up into eight 1-hour sub-intervals. The average values of the 1-hour sub-intervals could not deviate by more than a specified percentage from the average for the full 8-hour interval otherwise, the data were excluded. For the scores data, outliers were eliminated using the Mahalanobis distance as a criterion. Additional information concerning the use of the Mahalanobis distance can be found in "Multivariate Data Analysis, 5$^{th}$ Edition" by J. F. Hair, Jr., R. E. Anderson, R. L. Tatham, and W. C. Black; Prentice Hall (pub), 1998, pp. 66, 219, 224. After outlier removal, there were 569 data points in the validation set.

EXAMPLE 1

A variety of impact copolymers of polypropylene were manufactured over a three month period using a two reactor system such as the one described in FIGS. 1 and 2 above. These samples comprise the calibration data set.

The reactor system was fitted with an on-line nuclear magnetic resonance measurement system available from Oxford Instruments of North Andover, Mass. as the Oxford Instruments MagneFlow Rack Mount analyzer. This system was used to provide direct estimates of melt flow rate by performing a PLS regression of free induction decay curves generated by the analyzer.

NMR measurements were performed every six to eight minutes on a fresh polymer sample extracted from the process and subsequently handled as described below.

A 300 ml powder sample was extracted from the process and educted to the on-line NMR system where the powder was separated from the motive gas by a cyclone separator. The powder dropped by gravity into a pre-heater chamber where it was fluidized with hot nitrogen until it reached a designated temperature of 71 degrees Centigrade. A valve in the bottom of the preheater then opened and dropped the sample into the NMR probe located between the pole faces of a permanent magnet.

The sample was checked for adequate size and, if adequate, the measurement sequence was started. During the measurement sequence, the sample was subjected to a series of 90-degree radio frequency (RF) pulses and the free induction decay (FID) data were collected after each pulse. The FID signals for each sample were averaged and then sent to the NMR control computer for score generation and prediction of properties. The sample was then educted from the NMR probe and returned to the process stream.

The reactor control system employed a semi-empirical model of melt flow rate in accordance with Equation I, below:

$$\ln(MFR) = (1 - (\% RCSEG/100)) * \\ [B1 * (TOFFGAS1 - 145)/(TOFFGAS1 + 459.67) + \\ G1 * \ln(H2C3RAT1)] + (\% RCSEG/100) * \\ [G2 * \ln(H2C3RAT2) - G3 * \ln(C2C3RAT2)] + \\ A3 * SCORE3 + A4 * SCORE4 + A5$$

(Equation I)

where:
% RCSEG is the percent rubber in the manufactured impact copolymer;
TOFFGAS1 is the offgas temperature of the first reactor in degrees F;
H2C3RAT1 is the hydrogen to propylene molar ratio in the first reactor;
H2C3RAT2 is the hydrogen to propylene molar ratio in the second reactor;
SCORE3 is a third component of independent variability obtained from a partial least squares analysis of the NMR data;
SCORE4 is a fourth component of independent variability obtained from a partial least squares analysis of the NMR data; and
The coefficients A3, A4, A5, B1, G1, G2 and G3 were derived from the calibration data set by non-linear regression using Statistica, Release 5.5, available from StatSoft, Inc. of Tulsa, Okla.

More specifically, partial least squares analysis was used to obtain scores from the NMR calibration data. The scores were then combined with process model data and the combined process model data and scores non-linearly regressed to determine statistically significant terms. While non-linear regression is used in this Example, it should be noted that when the process model is linear, linear regression can be used instead of non-linear regression. When a statistically insignificant term was identified, that term was dropped from the combined score and process model, and the regression run again. This process was repeated until only statistically significant terms remained in the combined equation. In this case, the coefficients of statistically significant terms remaining after the analysis was completed had the values listed below:

A3=1.6154
A4=0.7701
A5=5.3367
B1=23.5065
G1=0.8338
G2=1.7243
G3=0.4716

As can be seen from observation of Equation I, the process model equation explicitly includes scores from mathematical transformation of the on-line analyzer data as terms in the process model equation.

Scores from the mathematical transformation of on-line NMR process data were selected by empirical evaluation of the partial least squares analysis of the data in a manner known to those skilled in the art. Typically, the results of the data analysis package will yield a number of scores, each of which correlates to a distinct (i.e. substantially independent) source of variability (represented by loadings vectors from PLS regression) in the analysis of the on-line NMR sample. The control engineer will take the scores and check to see which terms are most highly correlated to variability in melt flow rate (or other property of interest) and select those scores that represent statistically meaningful correlations to melt flow for use in the combined model.

It is important to note that the scores selected are not necessarily those from the instrument data that describe the highest variability of the sample data, but those that when combined with process data show the highest correlation to observed melt flows. Thus in this case, the scores selected for use in the model were the third and fourth scores, which described the third and fourth largest distinct components of variability in the sample results. These scores were selected because they were the only statistically significant results showing a high degree of correlation between observed and predicted process model melt flow rate when combined with the process data.

Figure 3:
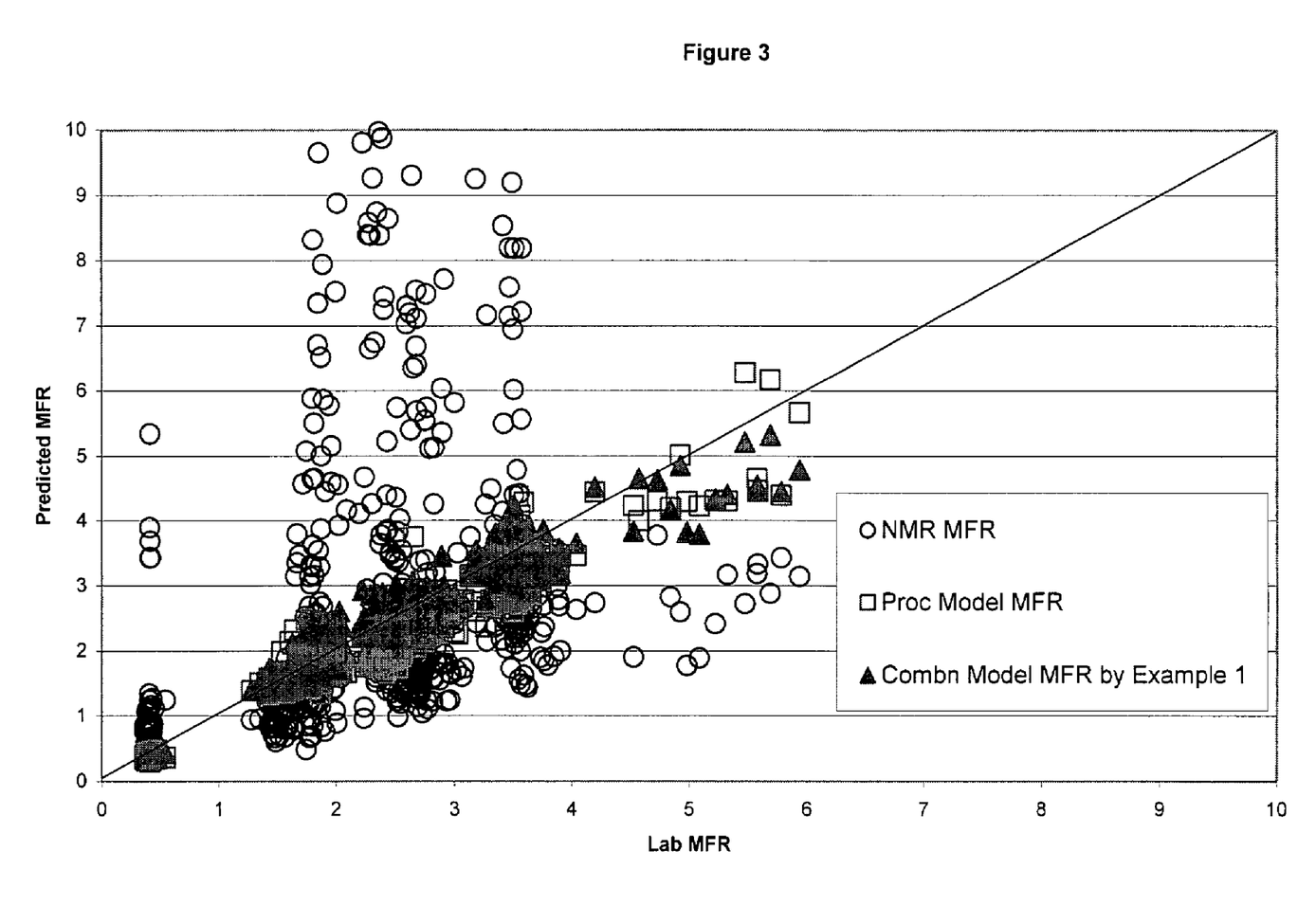
FIG. 3 is a plot showing the melt flow rate of a propylene polymer measured in the laboratory compared with melt flow rate as predicted by on-line instrumentation, as predicted by a validated process model, and as predicted by the validated model using both a combination of scores from mathematically transformed on-line NMR data and a process model of melt flow rate in accordance with Example 1 of the invention.

FIG. 3 is a plot of estimates of melt flow rate from three methods compared with laboratory measured melt flow rate for the validation data set. This demonstrates the superiority of melt flow estimates obtained by using a combination of a process model for melt flow and the scores obtained by a partial least squares analysis of free induction decay curves from the on-line NMR instrument.

The square data points of FIG. 3 represent a process model estimate of melt flow rates of impact copolymer powder. This process model is described in Example 2, Equations II, III and IV. The circular data points represent estimates of melt flow values obtained directly from the on-line NMR instrument which uses a four factor PLS model. The solid triangle data points represent estimated melt flow rates obtained from Equation I, which uses a combination of process model terms and scores from the on-line NMR instrument. FIG. 3 shows that the use of a combination of scores from NMR data in connection with a process model yields values that match the laboratory data more closely than the melt flow estimate produced directly by the NMR instrument or from the process model alone. Quantitatively, on the validation set, the root mean square error of prediction for the process model, for the NMR data, and for the combined approach of Example 1 are, respectively, 13.4%, 147.6% and 10.8%, where the root mean square error of prediction is calculated as below:

Root Mean Square Error of Prediction=100*$SQRT$ $((1/n)*\text{sum of}[\text{relative error in } MFR]^2)$ where the relative error in MFR is given by:

relative error=$[\{MFR(\text{observed})-MFR(\text{predicted})\}/ MFR(\text{observed})]$ and n is the number of data points, and the sum is taken over all n data points.

Thus, the approach using scores combined with a process model has the lowest root mean square error. Another physically meaningful measure for comparing different methods is counting the number of data points for which the percent relative error is within a range, such as ±20%. By this measure, the combined approach of Example 1 predicted MFR within ±20% of the observed MFR in 539 out of 569 data points in the validation set. In contrast, the process model predicted within ±20% in only 487 out of 569 data points, and the MFR estimate produced by the NMR instrument was within ±20% in just 119 out of 569 data points. This clearly shows the performance improvement obtained by combining a process model and scores from the NMR data, as described in Example 1.

Scores obtained by mathematically transforming NMR data can be used in combination with a process model in ways other than those described in Example 1, as is demonstrated by Example 2, below.

EXAMPLE 2

As in Example 1, a variety of impact copolymers of polypropylene were manufactured over a three-month period of time using a two-reactor system such as the one described above. These samples comprise the calibration data set. In this instance, an estimate of melt flow rate was first determined by using an existing process model, and that estimate refined using scores obtained by mathematically transforming on-line NMR data of the type obtained in Example 1.

The general process model used in this Example employs what those skilled in the art will recognize as the log blending rule and is described by the Equation II, below.

$\ln(MFRPROMODTOT)=(1-\%RCSEG/100)*\ln(MFRPROMOD1)+(\%RCSEG/100)*\ln(MFRPROMOD2)$ (Equation II)

where:

MFRPROMODTOT is the value of MFR obtained from the process model;

MFRPROMOD1 is a first component of the MFR model estimate attributable to the first reactor;

MFRPROMOD2 is a second component of the MFR model estimate attributable to the second reactor; and % RCSEG is the percent rubber in the manufactured impact copolymer.

The specific process model employed for MFRPROMOD1 is described by Equation III below.

$\ln(MFRPROMOD1)=6.8120+1.2597\ln(H2C3RAT1+0.000284AlMgRAT)$ (Equation III)

where:

MFRPROMOD1 is the process model's predicted first reactor melt flow rate;

H2C3RAT1 is the molar ratio of hydrogen to propylene in the first reactor; and

AlMgRAT is the molar ratio of aluminum to magnesium in the catalyst system.

The second reactor melt flow rate is modeled by Equation IV below.

$\ln(MFRPROMOD2)=1.5027+1.2771*\ln(H2C3RAT2)-1.3141*\ln(C2C3RAT)$ (Equation IV)

where:

MFRPROMOD2 is the process model's predicted melt flow rate for the incremental product made in the second reactor;

H2C3RAT2 is the molar ratio of hydrogen to propylene in the second reactor; and

C2C3RAT is the molar ratio of ethylene to propylene in the second reactor.

Values of MFRPROMODTOT are then augmented by scores obtained from mathematical transformation of the on-line NMR FID curves in accordance with Equation V, below.

$\ln(MFR)=A2*SCORE2+A3*SCORE3+A4*SCORE4+A5+B1*\ln(MFRPROMODTOT)$ (Equation V)

The values of A2-A5 and B1 were determined by linear regression of the scores from Equation V using the linear regression feature of a MICROSOFT EXCEL spreadsheet, and in this case were:

A2=0.3468
A3=1.1899
A4=0.6959
A5=0.03808
B1=0.8883

It should be noted that coefficient A1, of Score1 was dropped in this Example because it was statistically insignificant (i.e., in this particular instance, the "t" value of A1 fell within the range of −2.0 to 2.0).

Figure 4:
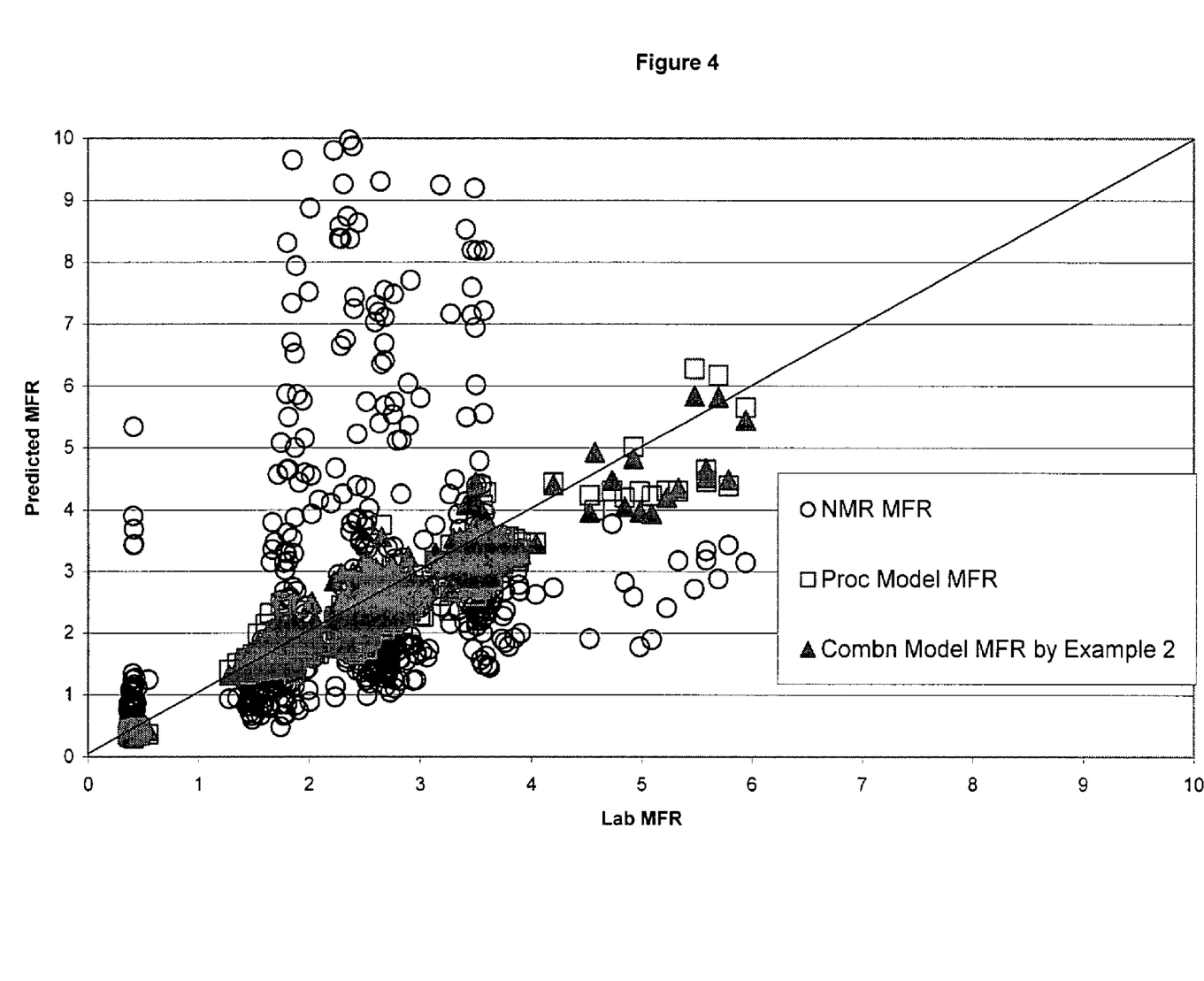
FIG. 4 is a plot showing the melt flow rate of a propylene polymer measured in the laboratory compared with melt flow rate as predicted by on-line instrumentation, as predicted by a validated process model, and as predicted by the validated model using both a combination of scores from mathematically transformed on-line NMR data and a process model of melt flow rate in accordance with Example 2 of the invention.

FIG. 4 is a plot of estimates of melt flow rate from three methods compared with laboratory measured melt flow rate for the validation data set. As with Example 1, square data points represent melt flow rate values of impact copolymer powder obtained from a process model alone. Circular data points represent estimates of melt flow values obtained directly from the on-line NMR instrument, and solid triangular data points represent estimated melt flow rates obtained from the foregoing equation, which uses a combination of scores from the on-line NMR instrument and the process model terms. FIG. 4 shows that the use of a combination of scores of NMR data in connection with the process model as described in Example 2 estimates the laboratory data more closely than the melt flow estimate produced by the NMR instrument or the process model alone.

In the foregoing process model, specific terms will be recognized and well known to those of ordinary skill in the art. Included terms are those such as aluminum to magnesium ratio (i.e., cocatalyst to catalyst ratio resulting from the use of an aluminum-containing cocatalyst in combination with a magnesium-containing Ziegler-Natta catalyst), hydrogen to propylene molar ratios, ethylene to propylene ratios, and percent rubber in the impact copolymer.

It should be noted that while Equations II, III, IV and V are exemplary models, other equations resulting from first principles, semi-empirical or empirical modeling techniques may be used in accordance with the invention, as all three types of models can benefit from the combination of scores with the process model in accordance with our invention.

Thus, an important point to be considered here is that the invention is not dependent on the use of any particular process model, but rather that the prediction of the process model can be improved by directly incorporating scores from a mathematical transformation of on-line process analysis equipment (such as an on-line NMR instrument) when compared to a prediction or measurement obtained from an on-line instrument used to directly estimate the desired property, or the use of a process model alone.

For the validation set of this Example 2, the root mean square error of prediction for the process model, for the NMR data, and for the combined approach of Example 2 are, respectively, 13.4%, 147.6% and 10.6%.

Thus, the combined approach of Example 2 has the lowest root mean square error. Another physically meaningful measure for comparing different methods is counting the number of data points for which the percent relative error is within a range, such as ±20%. By this measure, the combined approach of Example 2 predicted MFR within ±20% of the observed MFR in 545 out of 569 data points in the validation set. In contrast, the process model predicted within ±20% in only 487 out of 569 data points, and the MFR estimate produced by the NMR instrument was within ±20% in just 119 out of 569 data points. This clearly shows the performance improvement obtained by combining a process model and scores from the NMR data, as described in Example 2.

As mentioned above, the types of process models that can be combined with the scores resulting from the mathematical transformation of on-line instrumentation data in accordance with the invention, are well-known to those skilled in the art and can be generated for specific reactor configurations by those skilled in the modeling and control of chemical reactors. Representative examples can be found in U.S. Pat. No. 5,504,166 to Buchelli et al., the disclosure of which is hereby incorporated by reference.

Example 3, below, describes briefly both how a simple empirical model for the manufacture of impact copolymers of polypropylene is constructed, and how the model may be improved by the use of scores obtained from an on-line NMR instrument.

EXAMPLE 3

An impact copolymer plant of the type described in connection with FIGS. 1 and 2 operates with an empirical process model employing four simple non-linear multivariable predictive optimizer controllers 114, 116, 118 and 120, as shown in FIG. 2. This model is described in connection with Tables 1, 2, 3 and 4, below. Referring back to FIG. 2, solid lines between physical plant hardware elements 102 through 112 generally indicate the flow of material through system 100, while dashed lines to and from controllers 114 through 120 generally indicate the flow of process information and control information to and from controllers 114 through 120, computer 122, and the laboratory 124. It should be noted that the exact path of information flow from the process to controllers 114 through 120, the computer 122, and from the laboratory 124 need not be as shown in this example.

Tables 1 through 4 list the primary system variables that are manipulated by each optimizer, as well as the operating properties that are most directly affected by manipulation of corresponding system variables.

TABLE 1

| First Gas Composition Controller 114 | |
|---|---|
| Manipulated Variables | Control Variables |
| Hydrogen (H2) Flow<br>Ethylene (C2=) Flow<br>Gas Vent Flow (from liquid/gas separator) | Offgas Hydrogen to Propylene Ratio (H2/C3=)<br>Offgas Ethylene to Propylene Ratio (C2=/C3=)<br>Propane Concentration in Offgas Vent (C3 in vent) |
| Disturbance Variables | Constraint Variables |
| Gas Vent Rate<br>Make-up Rate (fresh monomer flow into the first reactor liquid/gas separator)<br>Production Rate | None |

First gas composition controller 114 is based on a time dependent, non-linear model that is developed by accumulating data for a representative operating period. The model is subsequently adjusted by a process control engineer familiar with the chemical process to be controlled as discussed below.

First, the relationship between the dependent and independent process variables is developed through the modeling software. The period of time required to collect sufficient data to develop a robust process model will vary, but for an impact copolymer plant such as shown in FIG. 2, operating periods of six months or so will provide excellent correlations between variables over a wide range of operating conditions and product slates.

Figure 5A:
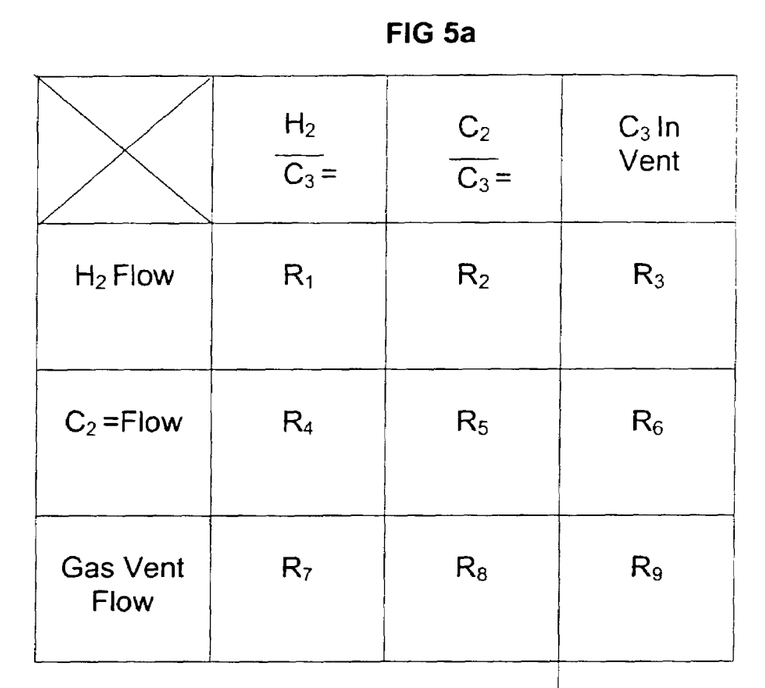
FIGS. 5a and 5b illustrate the relationships modeled by and selected for use in a non-linear multivariable predictive optimizer controller used in connection with the first gas composition controller described in Example 3.
Figure 5B:
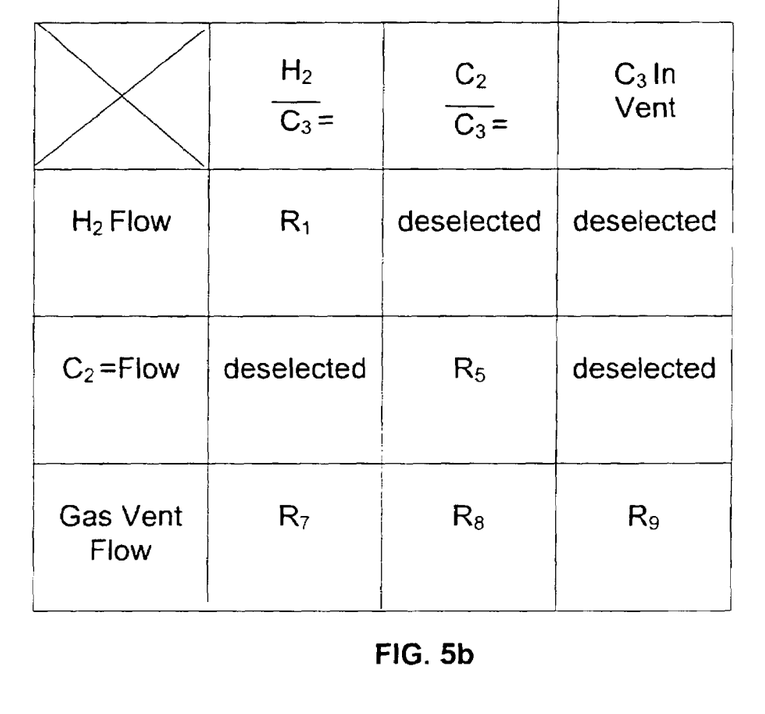

The model developed for first gas composition controller 114, and its subsequent modification for use by a process engineer, is schematized in FIG. 5.

FIG. 5a is a three by three matrix describing relationships R1 through R9, which are the correlations between hydrogen flow, ethylene flow, gas vent flow, offgas hydrogen to propylene ratio, offgas ethylene to propylene ratio and propane concentration in offgas vent, as modeled for first gas composition controller 114. These are non-stationary, often non-linear relationships which, although accurately describing the modeled performance of the first reactor offgas system, may or may not be suitable for stable reactor control.

Once these relationships have been developed, the process control engineer carefully examines each relationship to examine its effect on the process control model. Where the response of the model is deemed by the process engineer to be unstable, or otherwise not well suited for stable process control, the engineer deselects the modeled relationship from the model, leaving a matrix having a lesser number of relationships which are routinely used in the model for process control.

FIG. 5b represents a final configuration for the model used in first offgas controller 114. As can be seen from FIG. 5b, the relationships R2 (relationship between hydrogen flow and ethylene to propylene ratio), R3 (relationship between hydrogen flow and propane in the offgas vent), R4 (relationship between ethylene flow and hydrogen to propylene ratio) and R6 (relationship between ethylene flow and propane in the offgas vent) have been deselected from the model, either because of undesirable actions they are expected to cause in control response or because they are otherwise deemed inappropriate by the process control engineer.

During the process engineer's review of the model, he may also specify certain constraints within the model for any particular variable (for example, a limit imposed by the physical limitations of certain equipment), or may specify a variable as a disturbance variable (a variable known to impact a control variable but that is limited or prevented from manipulating that variable in the model.)

Techniques for the deselection of certain process relationships and the specification of process constraints are well-known to those skilled in the process control arts, and can be found, for example, in "Process Control: Structures and Applications", Balchen, J. G. and Mumme, K. I., Aspen Publishers, Inc. (1988), and "Application of Neural Networks to Modeling and Control", Gomm, J. B., Page, G. F. and Williams, D., Chapman and Hall, (1993), the disclosures of which are hereby incorporated by reference. Programs for developing models of this type are available commercially from a number of sources, such as the PROCESS INSIGHTS and PROCESS PERFECTER programs available from Pavilion Technologies, Inc. of Austin, Tex., or the ASPEN IQ and DMC PLUS programs available from Aspen Technologies, Inc. of Cambridge, Mass. Note that in the engineer's analysis of the relationships in a given controller such as in the first gas controller discussed above, disturbance variables would be listed and conceptually considered with the manipulated variables, while constraints would be considered conceptually with the control variables (i.e., the disturbance variables would be listed in the left hand column and the constraint variables would be listed in the top row of FIG. 5a). These constraint and disturbance variables have been omitted to simplify the foregoing explanation.

Tables 2, 3 and 4 specify the relationships used in first reactor controller 116, the second offgas controller 118, and the second reactor controller 120. The initial models for these controllers are developed in the same manner as that of first offgas controller 114, and are subsequently modified by the process control engineer, as discussed above.

TABLE 2

First Reactor Controller 116

| Manipulated Variables | Control Variables |
|---|---|
| Catalyst Flow | Production Rate |
| Hydrogen Concentration in Reactor | First Reactor Melt Flow Rate |
| Ethylene Concentration in Reactor | Percent Ethylene in Product |
| Reactor Vapor to Liquid Ratio | |

| Disturbance Variables | Constraint Variables |
|---|---|
| Electron Donor to Catalyst Ratio | Cooling Water Valve Position (to offgas condenser) |
| Reactor Temperature | |
| Catalyst Yield | Propylene Quench Liquid Valve Position |

The primary objectives of the first reactor controller are to maximize production rate, stabilize quality, and minimize transition time. Primary controller constraints that the controller must respect are the capabilities of the reactor cooling system and the reactor quench system.

In connection with the first and second reactor controllers, it should be noted that data for many properties is not directly available or will need to be modeled based on other measurable properties for use in the model. For example, if making a random copolymer of propylene and ethylene, values for percent ethylene, hexane extractables, melt flow rate, and decalin solubles are variables of this type. These properties can be modeled as required by those skilled in the chemical and control arts. Guidance on modeling properties of this type can also be found in the references noted above, as well as in U.S. Pat. Nos. 5,933,345 and 5,877,954, the disclosures of which are hereby incorporated by reference. Commercially available software suitable for modeling and/or control of these properties includes the ASPEN IQ and DMC PLUS software available from Aspen Technologies, Inc. and the PROCESS INSIGHTS and PROCESS PERFECTER software available form Pavilion Technologies, Inc.

Additional information about the application of controllers of the type discussed above can be found in U.S. Pat. No. 4,616,308 to Morshedi, and U.S. Pat. No. 4,349,869 to Prett, the disclosures of which are incorporated by reference in their entirety.

TABLE 3

Second Gas Composition Controller 118

| Manipulated Variables | Control Variables |
|---|---|
| Hydrogen (H2) Flow | Offgas Hydrogen to Propylene Ratio |
| Ethylene (C2=) Flow | Offgas Ethylene to Propylene Ratio |
| Gas Vent Flow (from liquid/gas separator) | Propane Concentration in Offgas Vent |
| | Propane Concentration in Recycle Liquid |

| Disturbance Variables | Constraint Variables |
|---|---|
| Make-Up Rate (fresh monomer flow into the second liquid/gas separator) | None |

It should be noted that the second reactor gas composition controller is essentially identical to the first reactor gas composition controller.

TABLE 4

Second Reactor Controller 120

| Manipulated Variables | Control Variables |
|---|---|
| Offgas Hydrogen to Propylene Ratio | Total Melt Flow Rate |
| Offgas Ethylene to Propylene Ratio | Polymer Rubber Fraction (% RCC2) |
| Activity Control Agent Flow | Ethylene Content in Rubber (% RC) |
| Reactor Vapor to Liquid Ratio | Percent Ethylene (% C2) |

| Disturbance Variables | Constraint Variables |
|---|---|
| Make-Up Rate (fresh monomer flow into the second reactor liquid/gas separator) | None |

The property estimation of NMR analyzer 113, and as a result second reactor controller 120, can be improved by combining data from on-line process instrumentation and mathematically transformed scores from NMR analyzer 113 as indicated in FIG. 2 to provide improved estimation of melt flow rate. This improved estimate will result in improved controller performance and hence manufacturing performance. Empirical process models useful in the invention can be simple or complex. The superiority of the embodiments just discussed over simpler empirical models relying on linear regression of on-line scores and measured process variables is illustrated by Example 4, below.

EXAMPLE 4

Scores from NMR data were obtained as in Example 2, above. The scores were linearly regressed with several process variables used in connection with the foregoing process models. The variables combined with the scores for regression included Al/Mg ratio, first reactor catalyst yield, second reactor incremental catalyst yield, first reactor offgas temperature, hydrogen to propylene ratio for the first reactor, hydrogen to propylene ratio for the second reactor, ethylene to propylene ratio for the second reactor, and percent rubber in the final impact copolymer product.

Of these variables, Al/Mg ratio, first reactor offgas temperature, and second reactor incremental catalyst yield were statistically insignificant when linearly regressed with the NMR scores and used to predict melt flow rate in a manner consistent with Example 2. All four scores obtained from analysis of the NMR data proved to be statistically significant.

Figure 6:
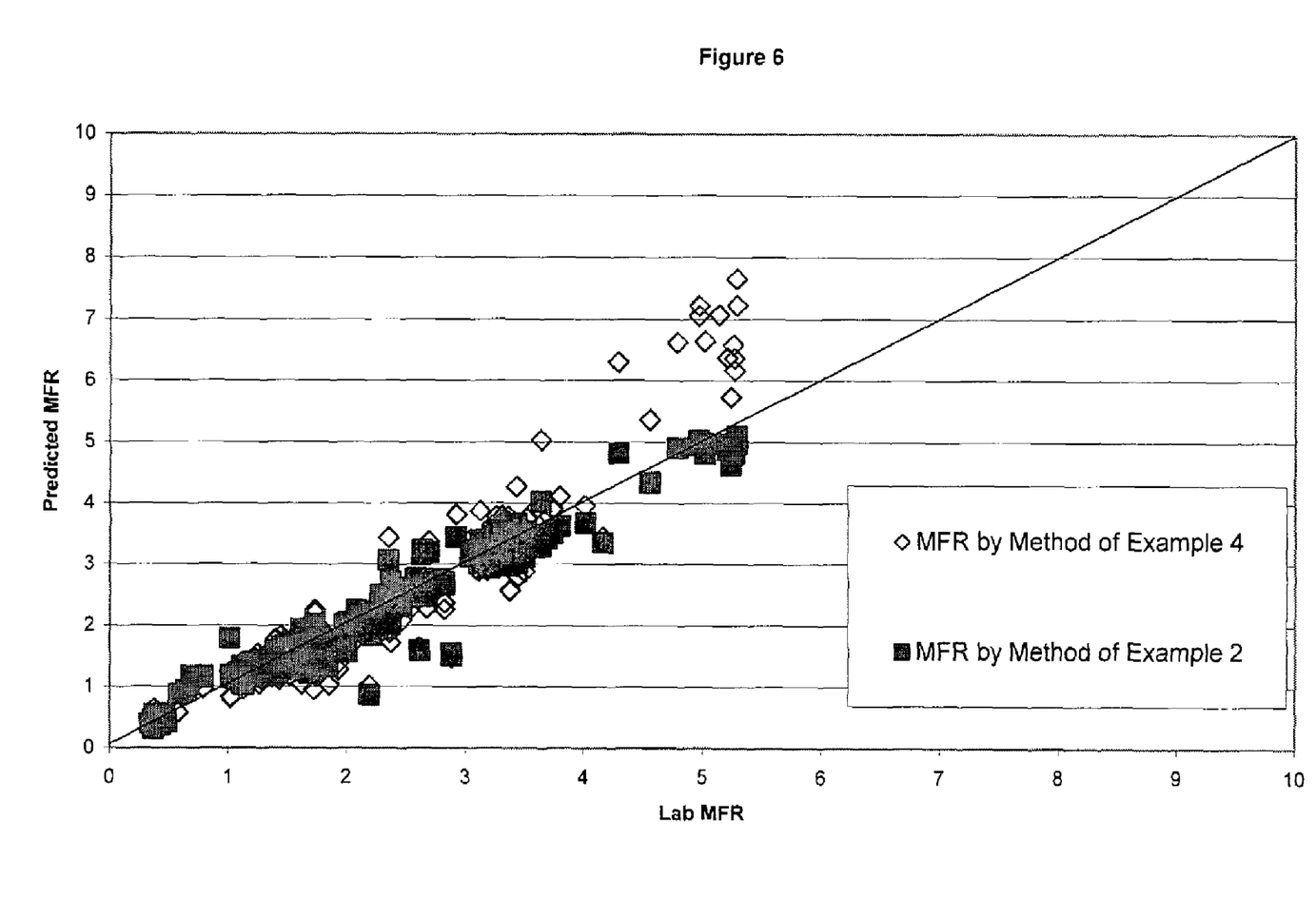
FIG. 6 is a plot of measured and predicted melt flow rates of Example 4.

FIG. 6 is a plot of predicted melt flow rate vs. melt flow rate as measured in the lab for the calibration set of 425 data points. The data points represent predicted melt flow rate by a model developed using the linear regression approach described above that combines scores with process data (plotted as diamonds on FIGS. 6 and 7), predicted melt flow rate by a model developed in accordance with Example 2, above, which combines scores with a process model (plotted as squares on FIGS. 6 and 7), and laboratory measurements of melt flow rate under the conditions input to the process models for each data point (plotted as the solid line on FIGS. 6 and 7).

As can be seen by comparing the data points on FIG. 6, the model developed by regressing scores and process data proved less accurate in predicting laboratory melt flow rate than did the method of Example 2 in accordance with our invention, where the model combined scores with a process model. The process data based model yielded 340 data points out of a total of 425 data points that were within ±20 percent of the laboratory value. This compared unfavorably with the predictions in accordance with our invention, which yielded 406 predicted melt flow rates of the total 425 data points that were within ±20 percent of the measured laboratory value.

Figure 7:
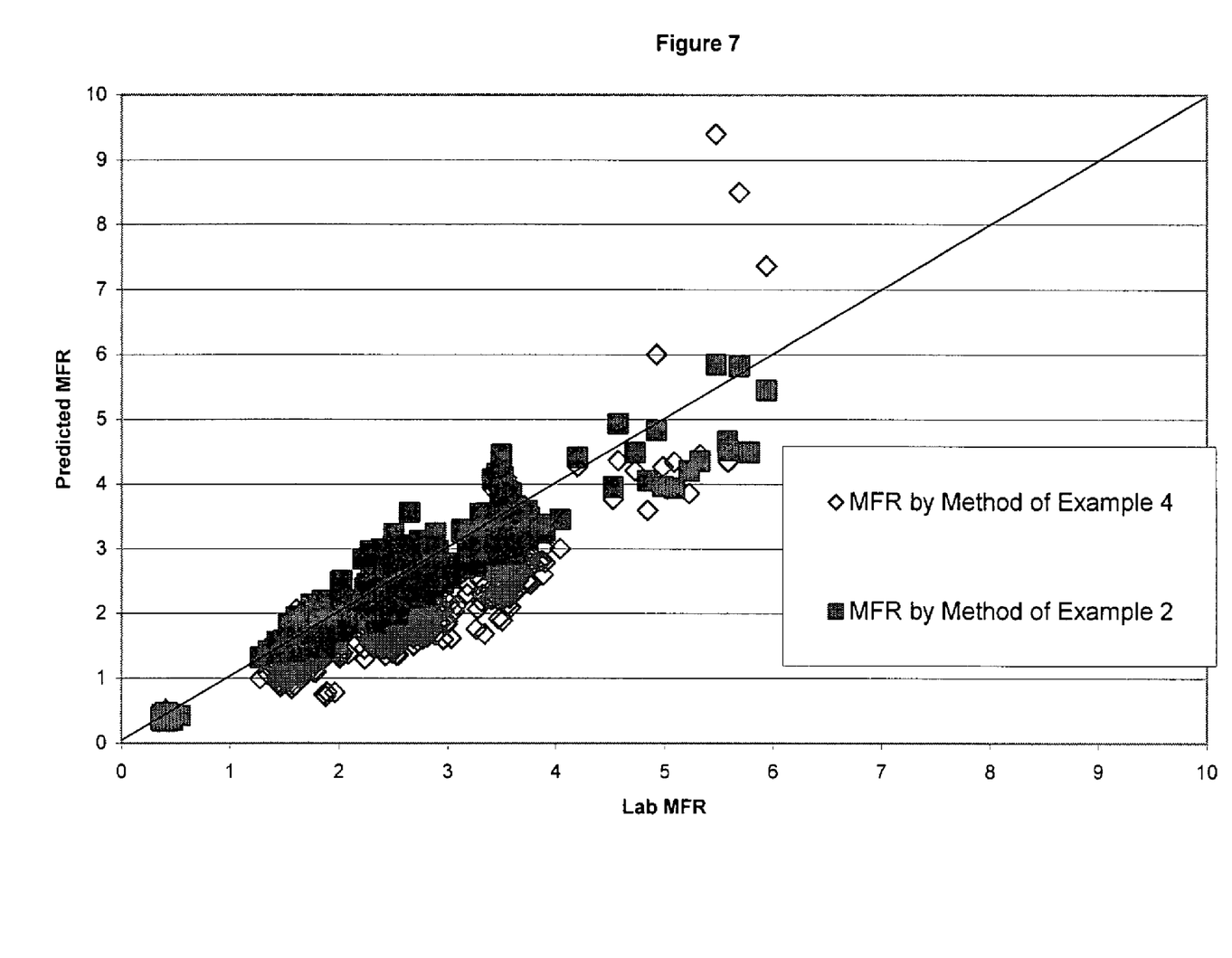
FIG. 7 is a plot of laboratory melt flow rate and validation data for predicted melt flow rates using the models created in connection with FIG. 6 and Example 4.

FIG. 7 is a plot of laboratory melt flow rate and validation data for predicted melt flow rates using the models created in connection with FIG. 6 in accordance with the methods of Example 2 and Example 4. The validation was done with 569 data points obtained during a twelve-month period of time after collection of the data used in model building. As can be seen from FIG. 7, predictions of melt flow rate using model validation data confirm the improved accuracy of the method of Example 2 when compared to the method of Example 4. The model in accordance with the invention yielded 545 data points out of 569 data points that were within ±20 percent of the laboratory value. This compared favorably with the predictions of the model based on the method of Example 4, which yielded 199 data points out of 569 data points that were within ±20 percent of the laboratory value.

Quantitatively, the root mean square error of prediction for the process model, for the NMR data, for the combined approach in accordance with the method of Example 2, and for the approach in accordance with Example 4, are, respectively, 13.4%, 147.6%, 10.6% and 27.1%. Thus, the combined approach of Example 2 has the lowest root mean square error. This demonstrates the superiority of the method of Example 2 when compared to the process model alone, the NMR data alone, or the method of regressing on-line scores and process variables, as in Example 4. While the method of Example 2 is superior in this application, we believe the simpler empirical method of Example 4 can be advantageously applied in many circumstances, particularly where an approach using combined process model data and scores has not been implemented in any form.

While the foregoing Examples of the invention illustrate the use of the invention to produce improved estimates of melt flow rate of impact copolymers of polypropylene, the invention may be used in a wide variety of chemical manufacturing applications, such as in the manufacture of a wide variety of chemicals including terephthalic acid, polystyrene, polymers of propylene, or ethylene, or alpha-olefin monomers containing from 4 to 20 carbon atoms, including combinations of two or more of the foregoing olefins or alpha olefins, polyvinyl chloride and polyethylene terephthalate, or combinations of any of the foregoing. Examples of olefinic polymers include polymers containing at least fifty weight percent of material originating as propylene monomer units and less than fifty weight percent (for example one, two, five or more weight percent) of material originating as monomers of a second olefin, such ethylene, or polymers containing at least fifty weight percent of material originating as ethylene monomer units and less than fifty weight percent (for example one, two, five or more weight percent) of material originating as C4, C6 or C8 alpha-olefins.

There are only two requirements for our invention to be potentially applicable to a manufacturing application. First, there needs to be a process model (i.e., not just process data) that can be used to generate an estimate of a product or process property useful in the manufacture of the product. Second, some type of on-line instrumentation should be available which will generate data, which can be mathematically transformed to yield scores indicative of variability in the product or process property. One or more scores correlative to the product or process property can then be incorporated into the process model in a manner similar to those described herein. It should also be noted that combinations and/or transforms of scores (for example, cross products, reciprocals, squares, and other mathematical transforms of the scores, collectively referred to hereafter as transformed scores) may be used as the scores in the invention as described above if the use of the transformed scores yield improved predictive ability of the combined scores and process model in accordance with the invention.

As mentioned earlier, "coefficients" from multivariate curve fits and "weights" or "hidden node outputs" from neural network analysis are analogous to scores in the Examples discussed above. Thus, like scores, they can be used to mathematically transform and/or reduce the dimensionality of process analyzer data. When using coefficients or weights or hidden node outputs in the invention, they are used in the same manner as scores or their transforms or combinations are used in the Examples above. As used in this application and elsewhere in the art, scores, coefficients, neural network weights and hidden node outputs are referred to generically as "gains".

Other specific examples where our invention can be employed include estimation of melt index or density for polyethylene, and estimates of the amount of alpha olefin comonomers incorporated into a copolymer material, such as C4, C6 and/or C8 content in high density polyethylene, medium density polyethylene, and/or linear low density polyethylene, where the manufactured material typically contains at least fifty weight percent of material originating as ethylene monomer units.

Other applications for our invention will be apparent to those skilled in the art upon their reading of the descriptions contained herein. Our invention, therefore, is not limited to any particular manufacturing process, process model or type of analyzer, and the scope of our invention is not otherwise limited, except as set forth by the following claims.

We claim:

1. A method to obtain an improved estimate of a process or product property useful in controlling a chemical manufacturing process, comprising:
   a. performing the chemical manufacturing process;
   b. employing a process model selected from the group consisting of empirical, semi-empirical and first principles models, to generate an estimate of at least one such property;
   c. employing an on-line analyzer to generate data which can be transformed mathematically to yield scores indicative of variability in such property;
   d. mathematically transforming the aforesaid data obtained from the on-line analyzer in step (c) to obtain a set of statistically significant scores correlative to the property;
   e. combining the scores obtained in step (d) with the process model to obtain a combined model; and
   f. optimizing the combined model by a linear or non-linear regression analysis, to generate an improved estimate of the property used in controlling the manufacturing process;
   provided the process model is not derived from regression of directly measured process variables only with scores.

2. The method of claim 1 wherein the process model explicitly includes scores from mathematical transformation of the on-line analyzer data as terms in the process model equation.

3. The method of claim 1 wherein the chemical manufacturing process is a polymerization manufacturing process.

4. The method of claim 3, wherein the process manufactures a polymeric material selected from the group consisting of polymers containing at least fifty weight percent propylene monomer units and polymers containing at least fifty weight percent of ethylene monomer units.

5. The method of claim 4, wherein a nuclear magnetic resonance spectrometer is used to obtain data which are mathematically transformed to obtain scores which are combined with a process model for the purpose of estimating a melt flow rate of polymeric material.

6. The method of claim 4, wherein the polymeric material is an impact copolymer comprising polymerized propylene and ethylene monomer units.

7. The process of claim 4 wherein the polymeric material comprises monomer units of butene, hexene, or octene alpha-olefins and at least fifty weight percent of ethylene monomer units.

8. The method of claim 1 wherein improved estimate generated in step f is input into the process controller to control the process.

9. The method of claim 8 further comprising the step of varying the output of the controller in response to the inputted estimated property to cause the property of interest to move toward a desired value.

10. The method of claim 8 wherein there are one or more controllers selected from the group consisting of Proportional Integral Derivative (PID), fuzzy logic controllers, and combinations thereof.

11. The method of claim 8 wherein the controller is a multivariate predictive optimizer controller, and a optimizer controller is used in association with a predictive process model.

12. The method of claim 11 wherein the data collected comprise free induction decay curves obtained from a nuclear magnetic resonance spectrometer.

* * * * *